United States Patent

[11] 3,538,996

| [72] | Inventor | Denis Ledoux<br>St. Pie, Quebec, Canada |
|---|---|---|
| [21] | Appl. No. | 738,041 |
| [22] | Filed | June 18, 1968 |
| [45] | Patented | Nov. 10, 1970 |
| [73] | Assignee | La Cie R.A. Lajoie Ltee<br>St. Pie, Quebec, Canada |

[54] MANURE ELEVATING CONVEYOR FOR STABLE CLEANING APPARATUS
6 Claims, 7 Drawing Figs.

[52] U.S. Cl. .................................................. 198/109, 198/124
[51] Int. Cl. ........................................................ B65g 21/02, B65g 41/00
[50] Field of Search ........................................ 198/109, 0(X), 119, 124, 90, 100, 125

[56] References Cited
UNITED STATES PATENTS

| 552,716 | 1/1896 | Matthiessen | 198/119 |
| 1,512,382 | 10/1924 | Walsh | 198/119X |
| 3,107,592 | 10/1963 | Mengel | 198/125X |
| 3,134,479 | 5/1964 | Daily | 198/109 |

FOREIGN PATENTS

| 740,723 | 8/1966 | Canada | 198/109 |
| 1,113,901 | 9/1961 | Germany | 198/124 |

*Primary Examiner*—Edward A. Sroka
*Attorney*—Pierre Lesperance

ABSTRACT: A manure elevating conveyor for stable cleaning apparatus including an inclined trough disposed outside the stable or barn, having a fixed inner portion and a cantilevered outer portion reinforced by truss work and pivoted to the inner portion for swinging movement, the truss work and the pivot arrangement serving to eliminate all overhanging or underlying support structure for the outer swingable portion.

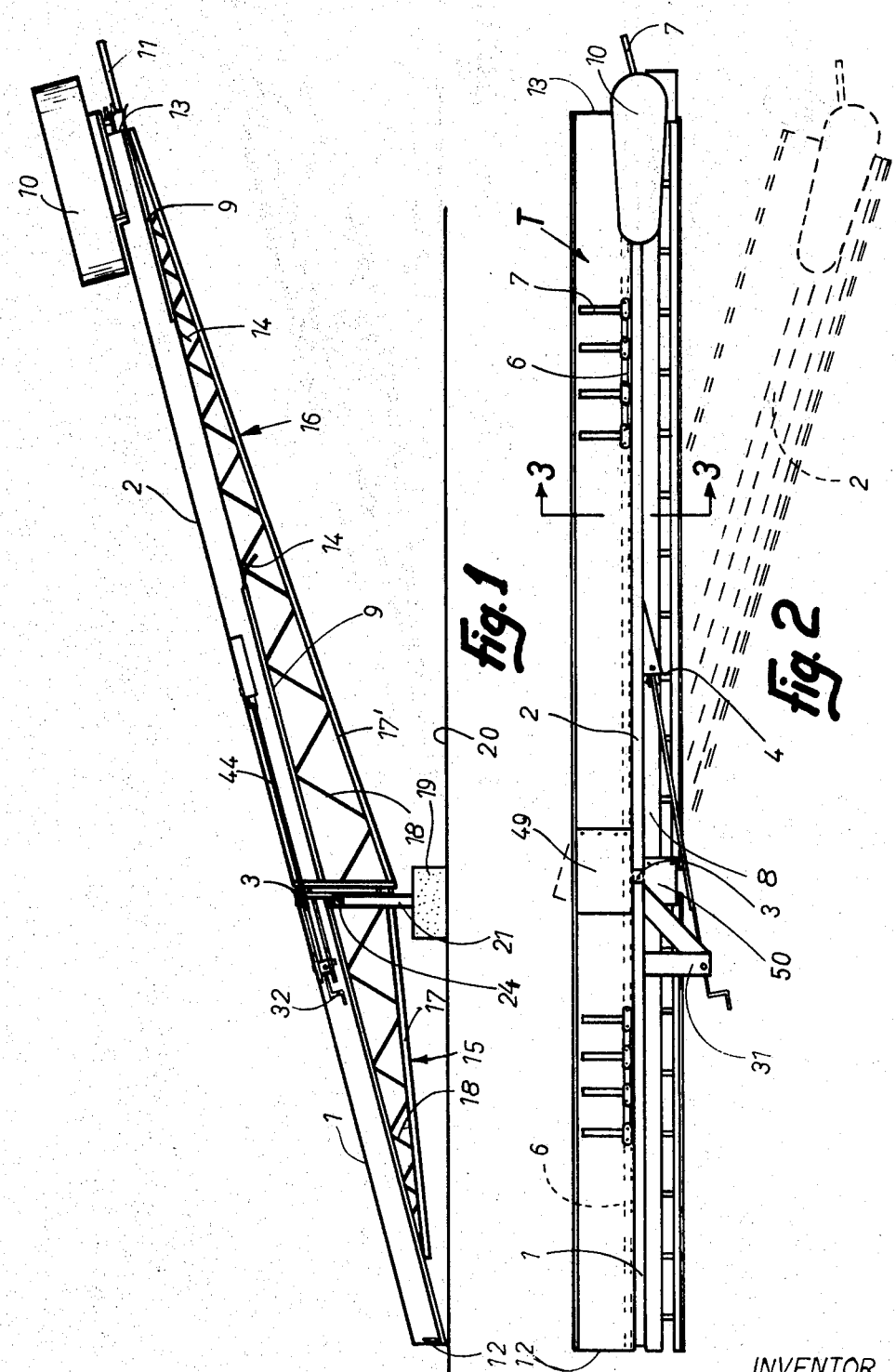

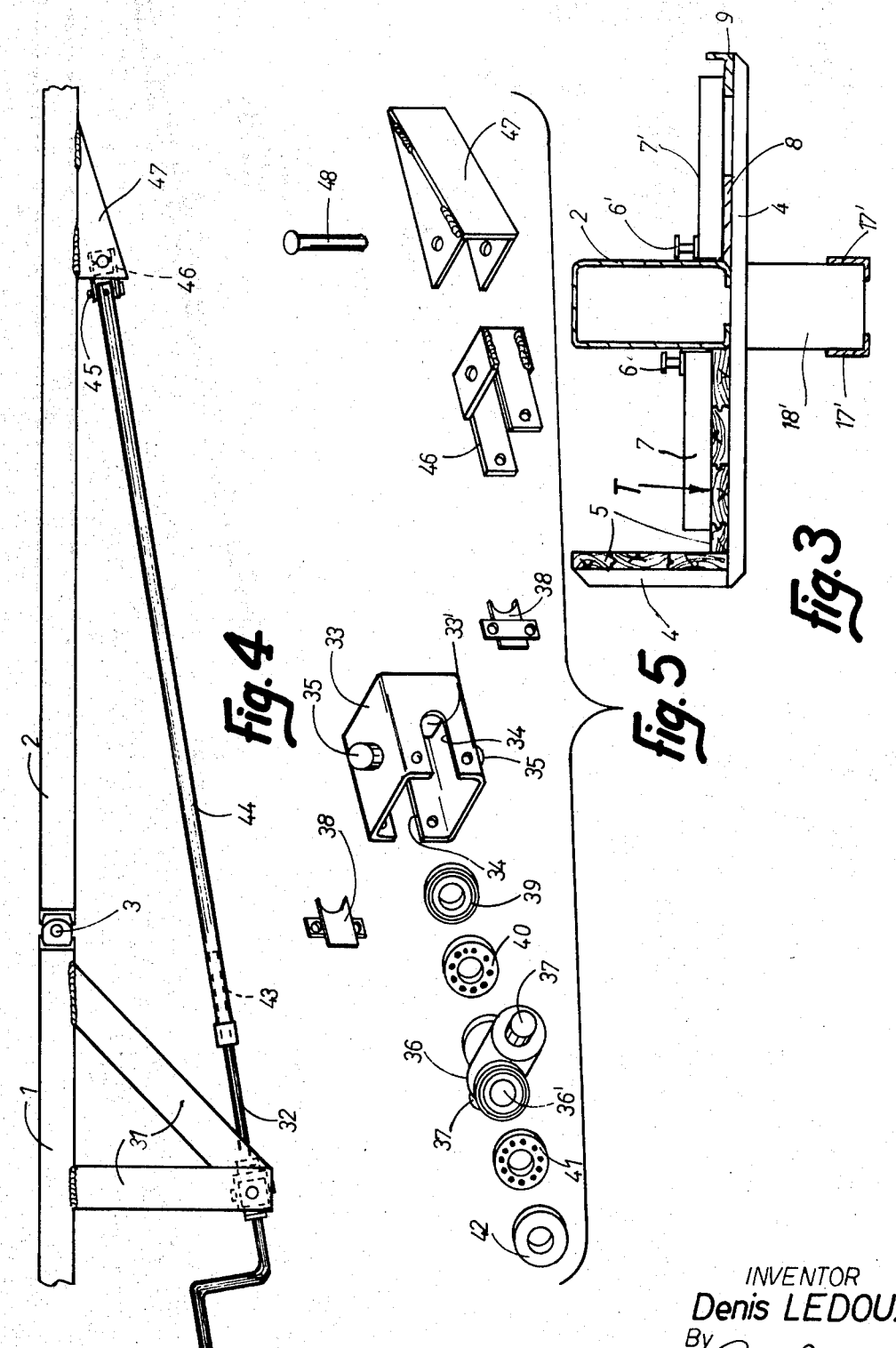

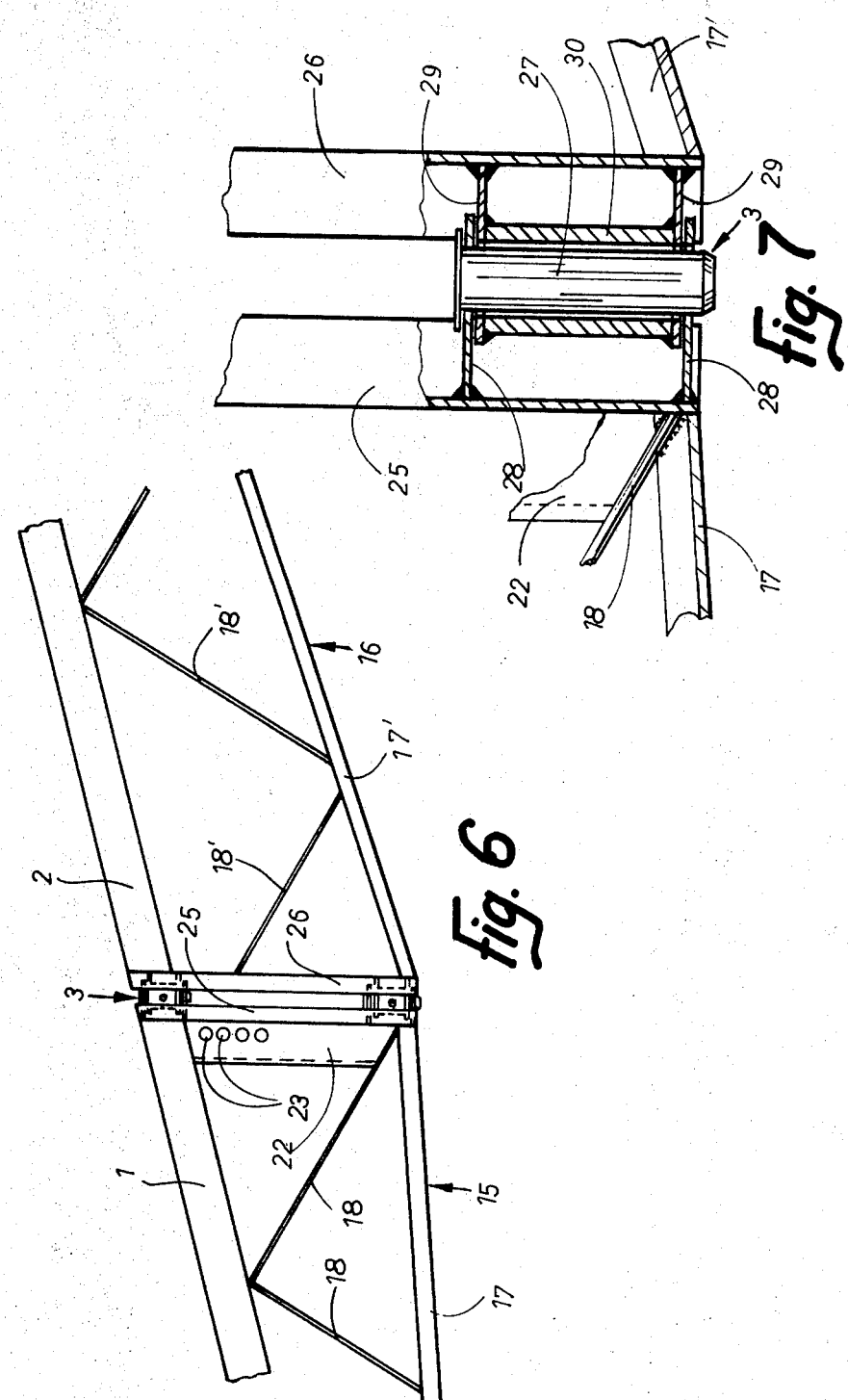

MANURE ELEVATING CONVEYOR FOR STABLE CLEANING APPARATUS

The present invention relates to an elevating and discharging conveyor system having an outer swingable section and more specifically to such a system associated with a stable-cleaning apparatus to discharge manure outside a stable or barn from an elevated position and along an arc of a circle to form stacks of manure.

Known elevating and discharging conveyor systems of the above-noted character have their outer section supported above ground, for swinging movement, by overhanging structure and/or an underlying carriage moving along a ground supported arcuate track, these systems including masts and overlying guy wires which often come out of adjustment, resulting in torsion and/or deflection of the beam and trough forming the outer portion. These systems are complicated and time-consuming to install and require frequent adjustment. Moreover, they often do not impart to the outer portion sufficient stability against the wind.

The general object of the present invention resides in means for overcoming the above-noted disadvantages.

A more specific object of the present invention resides in the provision of an elevating and discharging conveyor system for manure and the like, in which the beam of at least the outer swingable section is reinforced by truss work, and this truss work has a part spaced outwardly from the inner end of said outer beam in a vertical plane containing said outer beam, the hinge means for pivotally supporting said outer beam comprising a portion fixedly supported above ground and a portion pivotable relative to said truss fixed portion and secured to the inner end of said beam and also to said truss work part, whereby said swingable outer section is supported above ground solely by said hinge means and structures such as masts, guy wires, carriages and the like are entirely eliminated, and yet the outer swingable section is completely stabilized in a vertical plane as well as in a lateral plane against oscillation due to wind and other factors.

Another object of the present invention resides in the provision of a conveyor system of the character described, in which the outer end of the inner section is supported by a ground based support, in a manner so as to be vertically adjustable to obtain the desired inclination of the conveyor system despite variations in the installation of said ground based support.

Another object of the invention resides in the provision of a conveyor system of the character described, in which the pivotal axis of the outer section is vertical, whereby the discharge end of the conveyor remains at the same level irrespective of its angular position with respect to the lower stationary section of the conveyor system, thus enabling the formation of manure stacks of equal height along an arc of a circle and permitting the use of low power actuator means for swinging the conveyor outer section.

Another object of the present invention resides in the provision of simple manually-operated means to swing the conveyor outer section and to block the same to whatever angle is desired.

Another object of the present invention resides in the provision of a system of the character described, which entirely eliminates upkeep and maintenance, except occasional lubricating of the movable parts.

Another object of the present invention resides in the provision of a conveyor system of the character described, which, due to the vertical pivotal axis arrangement for the swingable outer section, there is no tendency for the return run of the conveyor scraper blades to either come into friction with the guide bar or to fall off its guiding system as frequently happens in systems in which the pivotal axis is perpendicular to the inclined beams.

The foregoing and other objects of the present invention will become more apparent during the following disclosure and by referring to the drawings, in which:

FIG. 1 is a side elevation of the manure elevating conveyor of the invention;

FIG. 2 is a top plan view;

FIG. 3 is a cross section taken along line 3–3 of FIG. 2;

FIG. 4 is a partial top plan view of the pivot joint and of the means for pivoting the outer portion of the elevating conveyor;

FIG. 5 is a perspective exploded view of the various elements forming part of the conveyor swinging system;

FIG. 6 is a partial side elevation of the pivot zone of the conveyor; and

FIG. 7 is a partial side view, on an enlarged scale, showing the lower pivot arrangement in section; In the drawings, like reference characters indicate like elements throughout.

FIG. 1 shows the manure elevating conveyor system in side elevation, said system being outside of a barn or stable. It comprises two normally aligned inclined inner and outer beams 1 and 2 pivoted together at 3, whereby the outer beam 2 can swing to about 30° to one side, as shown in dotted lines in FIG. 2, the inner beam 1 being stationary as its inner lower end and its outer upper end are fixed with respect to ground.

Referring to FIG. 3, each beam 1 and 2 is of hollow and of generally rectangular cross section and the transverse L-shaped support bars 4 are secured to its underside at regular intervals.

On one side of the beam, the L-shaped bars 4 support wooden boards defining with the beam a trough T for the manure, in which runs the active part of a manure conveyor system including a driving chain 6, to which are secured laterally extending scraper blades 7 at intervals along the chain.

The return run of the conveyor is shown at 6' and 7' on the other side of the beam; the scraper blades 7' are supported by a metal plate 8 and angle bar 9 running longitudinally of the beams 1 and 2 and supported by the cross bars 4.

The chain 6 is driven at the outer end of the beam 2 by a suitable conventional driving mechanism housed in a casing 10 and including a driving sprocket wheel 11 engaging the chain 6. Thus, the elevating conveyor forms an inclined trough having a lower end 12 receiving the conveyor from the stable and an upper discharge end 13 where the manure falls off the conveyor to form a manure stack underneath the same.

As shown in FIG. 1, the support plate 8 and angle bar 9 for the return run of the conveyor chain need not extend the entire length of beam 2 as is shown in FIG. 2, but may form sections with curved ends 14.

In accordance with the invention, beams 1 and 2 are reinforced and braced over their entire length by truss work 15 and 16 respectively. In the preferred embodiment shown, the truss work 15 and 16 extends underneath the beams 1 and 2 in a vertical plane containing said beams, but could be provided over the same, if so desired.

The truss work comprises a pair of angle bars 17, 17', as shown in FIG. 3, running longitudinally of beams 1 and 2 under the same and connected at spaced intervals with the beams 1 and 2 by inclined connecting plates 18, 18' respectively forming a triangular network.

The angle bars 17 and 17' are further apart from the beams 1 and 2 at the pivot 3 and gradually join with said beams at their opposite end. Consequently, the connecting plates 18 and 18' are of gradually decreasing length.

In the zone of pivot 3, the manure elevating conveyor comprises a ground based support. Said support includes a concrete base 19 directly supported by ground 20 and in which are anchored legs 21 engaging the outside of a channel 22 interconnecting inner beam 1 and plate 18 of the truss work of the stationary beam in the region of pivot 3 immediately inside thereof.

Member 22 is preferably provided with a plurality of vertically spaced holes 23 to receive a bolt 24 extending through the end of legs 21 to secure member 22 to legs 21 at an adjustable level.

The pivot or joint 3 comprises elongated member such as vertical channels 25, 26 disposed side by side at the adjacent ends of inner beam 1 and outer beam 2 respectively and extending downwardly to connect with the truss work angle bars 17, 17' respectively. These two channels 25 and 26 are thus parallel to each other and are pivotally connected at the top and bottom by removable pins 27, shown in FIG. 7, engaging perforated upper and lower plates 28 of one channel 25 and similar perforated plates 29 of the other channel 26, said other perforated plates being interconnected by a bushing 30 through which the pin 27 extends. As shown in FIG. 6, the top end 27 and associated hinge plates are located between the aligned beams 1 and 2.

In accordance with the invention, the pivot 3 constituted by the two pivot pins 27, forms a long hinge means extending from between the beams 1 and 2 to a point spaced from said beams in a vertical plane. Thus, the outer beam 2 is stabilized against vertical movement. The combination of this hinge means with the truss work and ground based support result in lateral stability of the system and in the elimination of all other supports for the outer beam 2.

In order to swing the outer beam 2 and trough to one side to approximately 30°, preferably the system shown in FIG. 4 is used. This is a manual system which can be used because pivot 3 is on a vertical axis but, obviously, power-operated means could be provided.

In the system illustrated, an angular bracket 31 is secured to the inner beam 1, adjacent pivot 3, and the junction of the two legs of the bracket 31 carries a universal type pivot arrangement, shown in exploded perspective view in the left hand side of FIG. 5, for receiving a crank handle 32, allowing rotation of said crank handle but preventing its longitudinal displacement.

More specifically, the universal joint comprises a box 33 open at one end and having an apertured end wall 33', slots 34 and top and bottom pivot studs 35. The studs 35 pivotally engage top and bottom walls of the bracket 31 for pivotal movement in about substantially vertical axis.

A cross-shaped member 36 forms the inner section of the universal joint. Said member includes opposite studs 37 engaging the slots 35 of box 33 and retained therein by retainer members 38, bolted or otherwise screwed to the sides of box 33.

The cross-shaped member 36 has a longitudinal hole 36' for receiving the crank handle 32. The perforated end wall 33' of the box serves as a support for a washer 39 and ball bearing 40, through which extends the crank handle.

On the other side of the cross-shaped piece 36, is also a ball bearing 41 and washer 42 surrounding the crank handle, the latter having a shoulder engaging washer 42, whereby to prevent longitudinal axial movement of the crank handle with respect to box 33, but allowing free rotation of said handle.

The outer end of the handle is threaded, as shown at 43, and engages an inwardly threaded tube 44, the outer end of which is pivotally connected by a cross pin 45 to the ears of a universal joint inner part 46, the outer part of said joint consisting of a triangular channel 47, welded or otherwise secured to the side of the outer beam 2. Parts 45 and 47 are pivotally interconnected by a pin 48 for movement in a plane transverse to the pivotal axis of pin 45.

Thus, rotation of the crank handle will swing the outer beam to any adjusted angular position with respect to the inner beam and the system will maintain the outer beam in its intended adjusted position.

The universal joint arrangements at the crank handle and the end of the tube are necessary, because the axis of pivot 3 is at an angle relative to beams 1 and 2.

At the pivot 3, the trough T and return support plate 8 of the outer beam carry plates 49 and 50 overlying the trough and support plate 8 of the inner section to form a continuation of the trough and conveyor return support when the outer section is at an angle relative to the inner section.

The side wall of the trough of the inner section has a slot at the level of the floor of the trough to provide insertion of plate 49. Similarly, plate 50 can be inserted under beam 1.

The elevating conveyor system of the invention is very quickly and easily installed on the building site and, as shown in FIG. 1, the space underlying the outer swinging section is entirely free of any obstruction and, therefore, farm tractors and the like can circulate freely underneath.

The outer section of the conveyor may be of considerable length and still its rigidity is complete due to the truss work arrangement and its stability is high due to the fact that the truss work braces the beam against a part of the hinge spaced outwardly from the outer beam in a vertical plane passing through said beam.

Because pivot 3 is vertical, discharge end 13 remains at the same level irrespective of the angular position of the outer section.

I claim:

1. A manure elevating and discharging conveyor portion for stable-cleaning apparatus, comprising an inclined inner beam adapted to be disposed mainly outside a stable or barn, said beam having a lower end at substantially ground level and an upper end spaced above ground, a ground based support supporting said upper end, a first elongated member secured to said upper end extending in a vertical plane, a first bracing member extending from and connected to the outer end of said first elongated member and secured to said inner beam and disposed in a vertical plane containing said beam, triangularly disposed first connecting members between said first bracing member and said inner beam and connected thereto, an inclined outer beam having a lower end and an upper end, a second elongated member secured to said lower end of said outer beam and extending in a vertical plane opposite to said first elongated member, hinge means interconnecting said first and second elongated members at vertically spaces zones of said elongated members, said hinge means having a vertical pivotal axis, a second bracing member extending from the outer end of said second elongated member and connected thereto at one end and running longitudinally of said outer beam and connected thereto near the upper end of said outer beam, triangularly disposed second connecting members between said second bracing member and said outer beam and connected thereto, first and second trough sections for manure secured to and extending along one side of said inner and outer beams, said sections overlapping in the region of said hinge means, manure conveyor means having an active run movable in said first and second trough sections towards said upper end of said outer beam to discharge manure, and a return run movable along the other side of said first and second beams, means secured to said beams to support said return run and means to swing said outer beam with respect to said inner beam and to maintain said outer beam in adjusted angular position with respect to said inner beam.

2. A manure elevating and discharging conveyor portion as claimed in claim 1, wherein said means for swinging said outer beam include extensible means, bracket means secured to the inner and outer beams and universal joint means connecting said extensible means with the respective bracket means.

3. A manure elevating and discharging conveyor portion as claimed in claim 1, further including means for removably securing said inner beam to said ground based support at an adjustable level.

4. A manure elevating and discharging conveyor portion as claimed in claim 1, wherein said means for swinging said outer beam include two spaced brackets laterally extending from and secured to the respective beams on each side of said hinge means, a first universal joint nonrotatably connected to one of said brackets, a threaded tube secured to said first universal joint, a threaded manually-operable crank threadedly engaging said tube, a second universal joint rotatably carrying said crank and supported by the other of said brackets, and means preventing axial displacement of said crank relative to said second universal joint.

5. A manure elevating and discharging conveyor portion as claimed in claim 1, wherein said truss work extends below said beam.

6. A manure elevating and discharging conveyor portion as claimed in claim 1, further including means for securing said inner beam to said ground-based support at an adjustable level and wherein said truss work extends below said beam.